US008380685B2

(12) United States Patent
Ito

(10) Patent No.: US 8,380,685 B2
(45) Date of Patent: Feb. 19, 2013

(54) INFORMATION PROCESSING APPARATUS, CONTROL METHOD THEREOF, COMPUTER PROGRAM, AND STORAGE MEDIUM

(75) Inventor: Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 12/553,077

(22) Filed: Sep. 2, 2009

(65) Prior Publication Data

US 2010/0082698 A1    Apr. 1, 2010

(30) Foreign Application Priority Data

Sep. 22, 2008  (JP) .................................. 2008-243337

(51) Int. Cl.
    *G06F 17/30*    (2006.01)
(52) U.S. Cl. ........................................ 707/694; 707/729
(58) Field of Classification Search .................. 707/694, 707/729

See application file for complete search history.

(56) References Cited

U.S. PATENT DOCUMENTS

| 5,434,965 | A  * | 7/1995 | Matheny et al. ............... 715/710 |
| 5,787,414 | A    | 7/1998 | Miike et al. |
| 6,397,213 | B1 * | 5/2002 | Cullen et al. ........................... 1/1 |
| 2007/0038937 | A1 * | 2/2007 | Asakawa et al. ............... 715/730 |
| 2008/0144942 | A1   | 6/2008 | Besley et al. |
| 2008/0229240 | A1 * | 9/2008 | Garbow et al. ............... 715/810 |

FOREIGN PATENT DOCUMENTS

| JP | 2002032397 A | 1/2002 |
| JP | 2007310501 A | 11/2007 |

OTHER PUBLICATIONS

Mao, Song, and George R. Thoma. "Bayesian learning of 2D document layout models for preservation metadata extraction." Proceedings of the Fourth IASTED International Conference on Visualization, Imaging, and Image Processing. 2004.*
Van Beusekom, Joost, et al. "Example-based logical labeling of document title page images." Document Analysis and Recognition, 2007. ICDAR 2007. Ninth International Conference on. vol. 2. IEEE, 2007.*
European Search Report dated Feb. 5, 2010 in corresponding European Application No. 09170602.8.

* cited by examiner

*Primary Examiner* — Usmaan Saeed
*Assistant Examiner* — Nan Hutton
(74) *Attorney, Agent, or Firm* — Fitzpatrick, Cella, Harper & Scinto

(57) ABSTRACT

An information processing apparatus is provided. The apparatus comprises an association unit configured to divide input image data into regions and to associate each region with one or more types of objects; an addition unit configured to add metadata to each object based on the type of each object; and a determination unit configured to determine whether or not a specific object that associates a first one of the regions with a second one of the regions different from the first one is present among the objects. In the case where the determination unit has determined that the specific object is present, the addition unit is configured to further add, to a first object that is present in the first one of the regions, metadata for associating the second one of the regions with the first one of the regions.

10 Claims, 12 Drawing Sheets

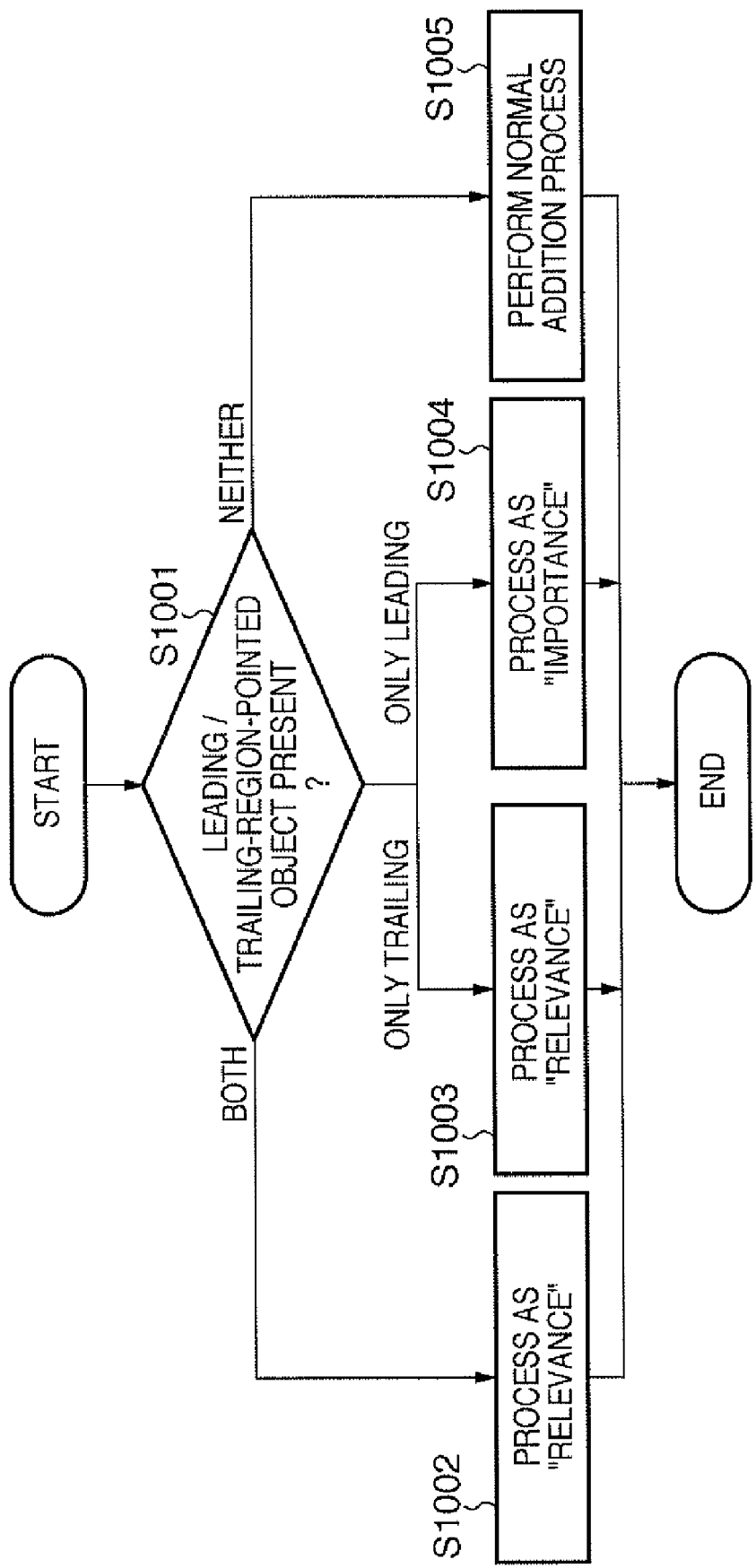

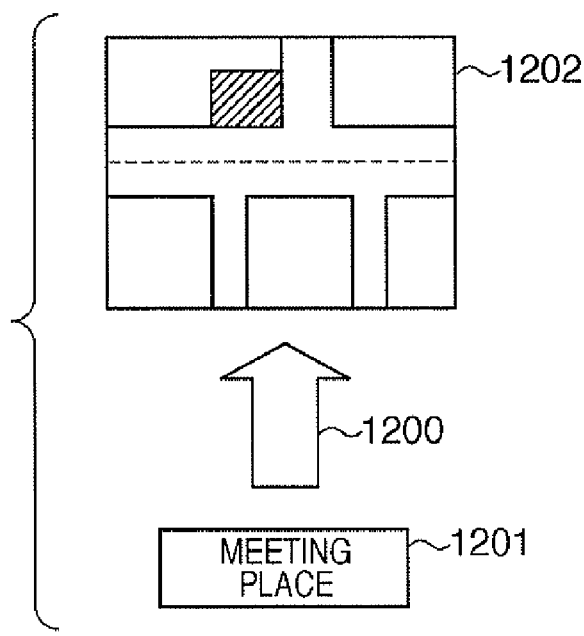
F I G. 12A
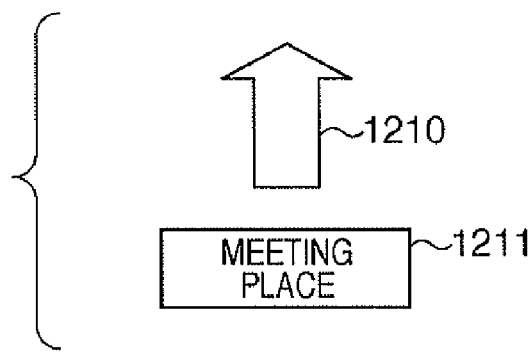
F I G. 12B
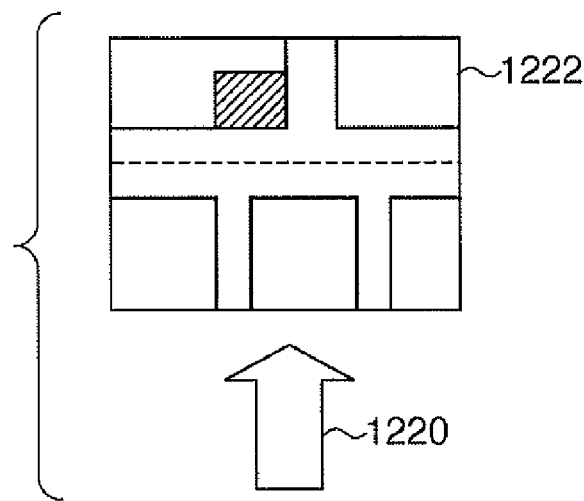
F I G. 12C

FIG. 13

| 1300 LEADING-REGION-POINTED OBJECT | 1301 TRAILING-REGION-POINTED-OBJECT | 1303 LEADING-REGION METADATA | 1304 TRAILING-REGION METADATA | 1305 SPECIFIC METADATA |
|---|---|---|---|---|
| TEXT | TEXT | TRAILING-REGION CHARACTER STRING | LEADING-REGION CHARACTER STRING | RELEVANCE |
| TEXT | PHOTOGRAPH | TRAILING-REGION PHOTOGRAPH | LEADING-REGION CHARACTER STRING | RELEVANCE |
| TEXT | GRAPHIC | TRAILING-REGION GRAPHIC | LEADING-REGION CHARACTER STRING | RELEVANCE |
| TEXT | SPECIFIC | OBJECT FURTHER INDICATED BY TRAILING-REGION | LEADING-REGION CHARACTER STRING | RELEVANCE |
| PHOTOGRAPH | TEXT | TRAILING-REGION CHARACTER STRING | LEADING-REGION PHOTOGRAPH | RELEVANCE |
| PHOTOGRAPH | PHOTOGRAPH | TRAILING-REGION PHOTOGRAPH | LEADING-REGION PHOTOGRAPH | RELEVANCE |
| PHOTOGRAPH | GRAPHIC | TRAILING-REGION GRAPHIC | LEADING-REGION PHOTOGRAPH | RELEVANCE |
| PHOTOGRAPH | SPECIFIC | OBJECT FURTHER INDICATED BY TRAILING-REGION | LEADING-REGION PHOTOGRAPH | RELEVANCE |
| GRAPHIC | TEXT | TRAILING-REGION CHARACTER STRING | LEADING-REGION GRAPHIC | RELEVANCE |
| GRAPHIC | PHOTOGRAPH | TRAILING-REGION PHOTOGRAPH | LEADING-REGION GRAPHIC | RELEVANCE |
| GRAPHIC | GRAPHIC | TRAILING-REGION GRAPHIC | LEADING-REGION GRAPHIC | RELEVANCE |
| GRAPHIC | SPECIFIC | OBJECT FURTHER INDICATED BY TRAILING-REGION | LEADING-REGION GRAPHIC | RELEVANCE |
| SPECIFIC | TEXT | TRAILING-REGION CHARACTER STRING | OBJECT FURTHER INDICATED BY LEADING-REGION | RELEVANCE |
| SPECIFIC | PHOTOGRAPH | TRAILING-REGION PHOTOGRAPH | OBJECT FURTHER INDICATED BY LEADING-REGION | RELEVANCE |
| SPECIFIC | GRAPHIC | TRAILING-REGION GRAPHIC | OBJECT FURTHER INDICATED BY LEADING-REGION | RELEVANCE |
| SPECIFIC | SPECIFIC | OBJECT FURTHER INDICATED BY TRAILING-REGION | OBJECT FURTHER INDICATED BY LEADING-REGION | RELEVANCE |

INFORMATION PROCESSING APPARATUS, CONTROL METHOD THEREOF, COMPUTER PROGRAM, AND STORAGE MEDIUM

BACKGROUND OF THE INVENTION

1. Field of the Invention

The present invention relates to an information processing apparatus, a control method thereof, a computer program, and a storage medium.

2. Description of the Related Art

A method that divides image data into regions and adds metadata to text objects, photograph objects, and graphic objects contained in each of those regions has been used conventionally. For example, when adding such metadata to a text object, character encoding information is added that is obtained by executing an OCR process.

For photograph objects and graphic objects, a character string is obtained by executing an OCR process on a text object nearby the object to which the metadata is to be added, and that character string is added to the photograph object or graphic object. Here, "graphic" refers to an image that has features such as more clearly-defined outlines in the subject, more limited colors, and so on than a natural image such as a photograph. Graphics can be generated by vectorizing figures such as lines, arrows, and so on created using graphic designing software. It is therefore possible for a user to perform searches and so on using the metadata added to the image data (see Japanese Patent Laid-Open No. 2002-32397).

However, a text object that expresses the content of such photograph objects or graphic objects is not necessarily always in the vicinity of that photograph object or graphic object. Furthermore, although creators of image data sometimes use graphic objects to express the relevance objects have to one another, the importance of an object, and so on, such information is not considered at all in the aforementioned method. This method therefore does not add the appropriate metadata to objects, and is thus difficult for a user to use.

SUMMARY OF THE INVENTION

According to one aspect of the present invention, an information processing apparatus comprising: an association unit configured to divide input image data into regions and to associate each region with one or more types of objects; an addition unit configured to add metadata to each object based on the type of each object; and a determination unit configured to determine whether or not a specific object that associates a first one of the regions with a second one of the regions different from the first one is present among the objects, wherein in the case where the determination unit has determined that the specific object is present, the addition unit is configured to further add, to a first object that is present in the first one of the regions, metadata for associating the second one of the regions with the first one of the regions.

According to another aspect of the present invention, a control method for an information processing apparatus, the method comprising the steps of: dividing input image data into regions and associating each region with one or more types of objects; adding metadata to each object based on the type of each object; and determining whether or not a specific object that associates a first one of the regions with a second one of the regions different from the first one is present among the objects, wherein in the case where the determining has determined that the specific object is present, the adding further adds, to a first object which is present in the first one of the regions, metadata for associating the second one of the regions with the first one of the regions.

Further features of the present invention will become apparent from the following description of an exemplary embodiment (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a flowchart illustrating exemplary details of specific object processing according to an embodiment of the present invention;

FIGS. 12A to 12C are diagrams illustrating differences between pieces of image data caused by the presence/absence of a leading-region-pointed object/trailing-region-pointed object, according to an embodiment of the present invention;

FIG. 13 is an exemplary table 1300 referred to when adding metadata, according to an embodiment of the present invention.

DESCRIPTION OF THE EMBODIMENTS

Embodiments of the present invention shall be described hereinafter with reference to the appended diagrams. In the embodiments, a multifunction peripheral ("MFP", hereinafter) shall be used as the information processing apparatus according to the present invention.

First Embodiment

Figure 1:
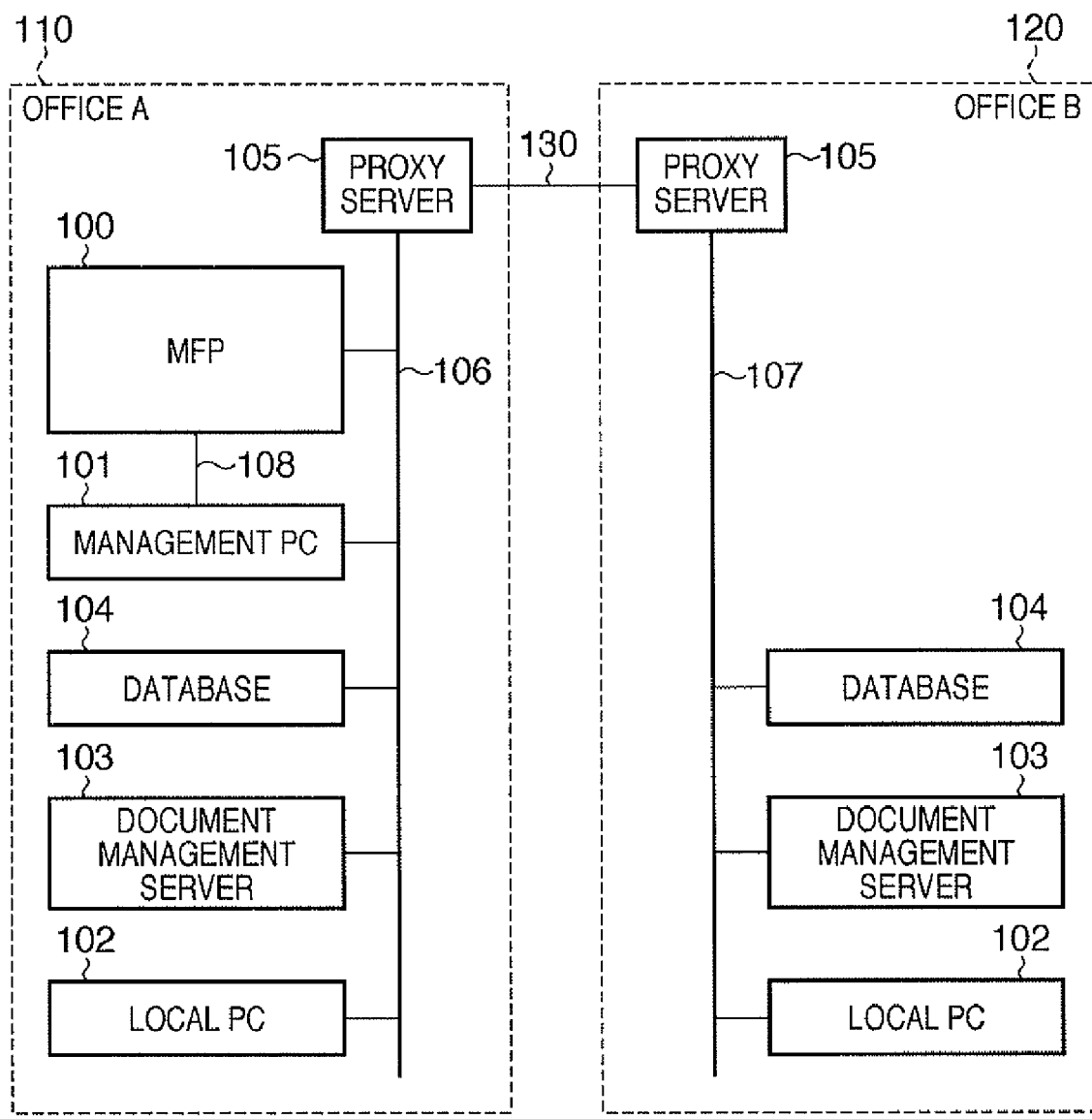
FIG. 1 is a diagram illustrating an exemplary image processing system that uses an MFP, according to an embodiment of the present invention.
Figure 2:
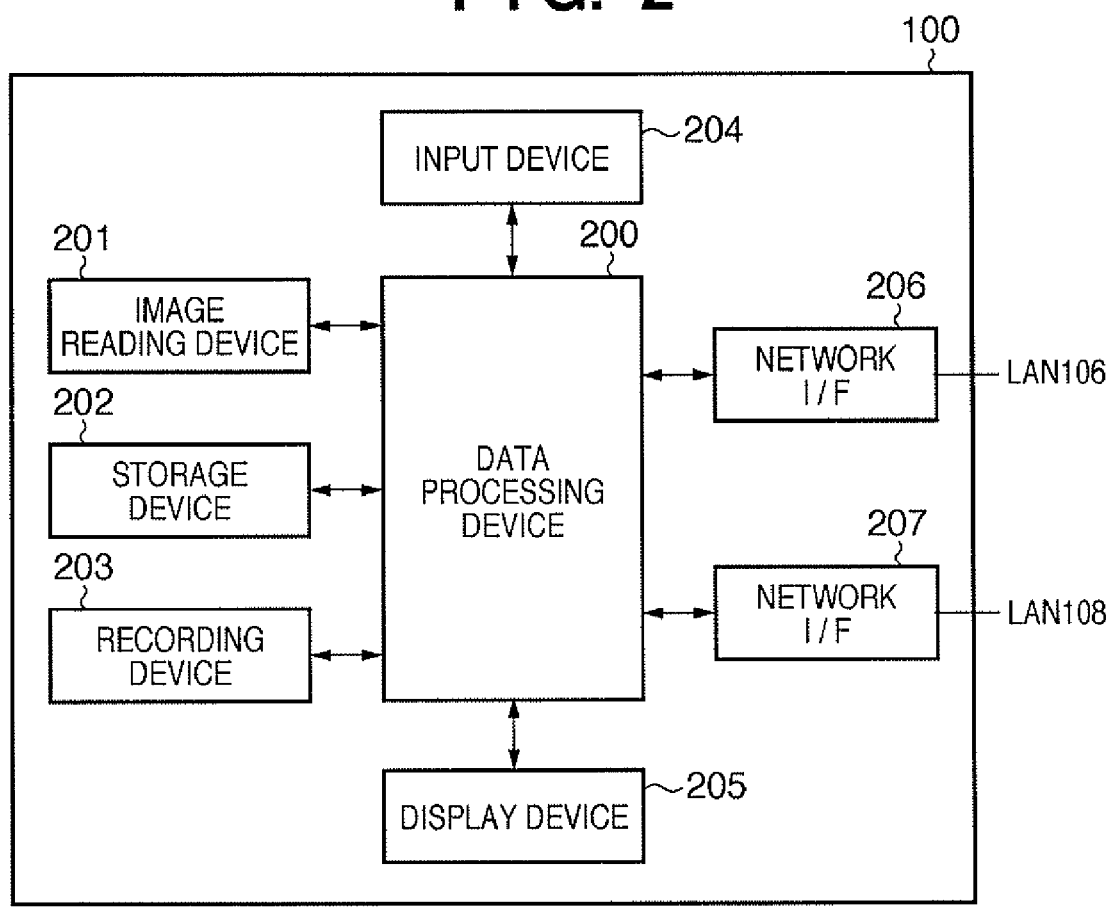
FIG. 2 is an exemplary hardware block diagram illustrating an MFP 100 according to an embodiment of the present invention.
Figure 3:
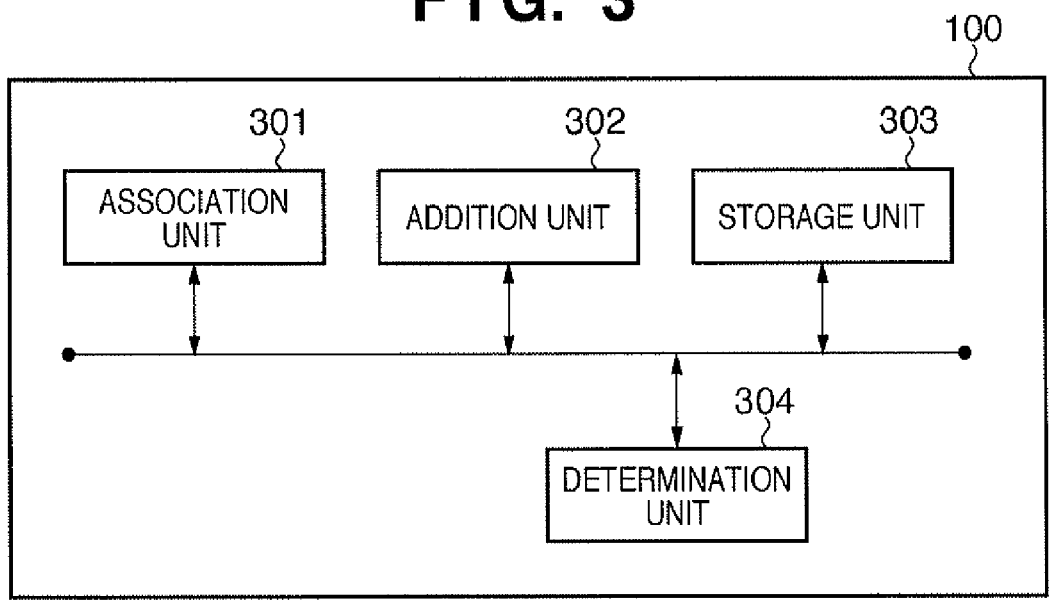
FIG. 3 is an exemplary function block diagram illustrating the MFP 100 according to an embodiment of the present invention.

First, the configuration of an MFP 100 according to the present embodiment shall be described using FIGS. 1 to 3.

(Image Processing System)

FIG. 1 is a diagram illustrating an exemplary image processing system that uses an MFP, according to an embodiment of the present invention. The image processing system is used in an environment in which an office A 110 and an office B 120 are connected via the Internet 130.

The MFP 100, a management PC 101, a local PC 102, a document management server 103, and a database 104 for the document management server 103 are connected to a LAN 106 that is installed in the office A 110. The MFP 100 is furthermore directly connected to the management PC 101 via a LAN 108. Meanwhile, a local PC 102, a document management server 103, and a database 104 for the document management server 103 are connected to a LAN 107 that is installed in the office B 120. The LANs 106 and 107 are connected to proxy servers 105, and are connected to the Internet 130 via the proxy servers 105. The LAN 108, meanwhile, is used for the exchange of data, control signals, and so on between the MFP 100 and the management PC 101.

The MFP 100 handles one part of image processing performed on input image data obtained by reading an original document. The MFP 100 outputs the result of the image processing performed on the input image data to the management PC 101 via the LAN 108. The MFP 100 also functions as a printer by analyzing Page Description Language ("PDL" hereinafter) data sent from the local PC 102 or a general-purpose PC (not shown). Furthermore, the MFP 100 has a function for sending input image data to the local PC 102 or a general-purpose PC (not shown).

The management PC 101 is a computer that includes an image storage function, an image processing function, a display function, an input function, and so on, and controls the MFP 100.

(MFP)

The configuration of the MFP 100 shall now be described using FIGS. 2 and 3. FIG. 2 is an exemplary hardware block diagram illustrating the MFP 100. The MFP 100 includes a data processing device 200, an image reading device 201, a storage device 202, a recording device 203, an input device 204, and a display device 205. The MFP 100 is connected to the LANs 106 and 108 via network I/Fs 206 and 207, respectively.

The data processing device 200 performs the overall control of the MFP 100. To be more specific, when a normal copying function is executed, the data processing device 200 performs, on the image data, an image process for copying, thereby converting the image data into a print signal. When copying multiple sheets, the data processing device 200 first holds print signals in the storage device 202 on a page-by-page basis and outputs the signals to the recording device 203 sequentially thereafter, thus forming recorded images upon recording paper. The data processing device 200 also analyzes and processes PDL data outputted from the local PC 102 via a driver. Furthermore, the data processing device 200 adds metadata to the input image data, which shall be described later.

In the present embodiment, "metadata" refers to data related to the content expressed by an object. For example, when the object is a photograph, the data expressed by that object is the photograph itself; however, keywords such as the title of the photograph, the shooting location, and so on can be added as the metadata of that object. Using keywords contained in such metadata enables image searches, automatic image classification, and so on, which in turn makes it possible to improve the convenience of the system. For example, when a user enters a keyword, objects to which metadata that includes that keyword has been added are displayed as search results.

The image reading device 201 includes an auto document feeder (not shown), and irradiates the image or images on a single original document or a bundle of original documents using a light source; the image reflected thereby is formed upon a solid-state image sensor using a lens. The solid-state image sensor then generates an image reading signal of a predetermined resolution (for example, 600 dpi) and a predetermined brightness level (for example, 8 bits), thereby composing image data, which is in turn composed of raster data from the image reading signal.

The storage device 202 saves data from the image reading device 201, data in which the PDL data outputted from the local PC 102 via a driver has been rendered, and so on. The recording device 203 records, onto recording paper, PDL data outputted by the local PC 102 or another general-purpose PC (not shown) using a driver. The input device 204 is a key operation unit or the like provided in the MFP 100, and is used to input operations and other types of data to the MFP 100. The display device 205 displays operation input states, image data, and so on.

FIG. 3 is an exemplary function block diagram illustrating the MFP 100. Only the minimum functions required to describe the present embodiment shall be mentioned here, and other functions shall be omitted. The MFP 100 includes an association unit 301, an addition unit 302, a storage unit 303, and a determination unit 304.

The association unit 301 divides the input image data into regions and identifies each region as an object. Although the objects are described as being classified as, for example, text, photographs, or graphics (lines, tables, and so on) in the present embodiment, the present invention is not limited to such classifications. The addition unit 302 adds metadata expressing object attributes to each object. The storage unit 303 stores input image data, specific objects (explained later), and so on. The data processing device 200 performs the functions of the association unit 301, the addition unit 302, and so on, whereas the storage device 202 and the like perform the functions of the storage unit 303. The determination unit 304 determines whether or not a specific object associating a region inside the input image data with a region aside from that region is present.

(Input Image Data Obtainment Process)

Figure 4:
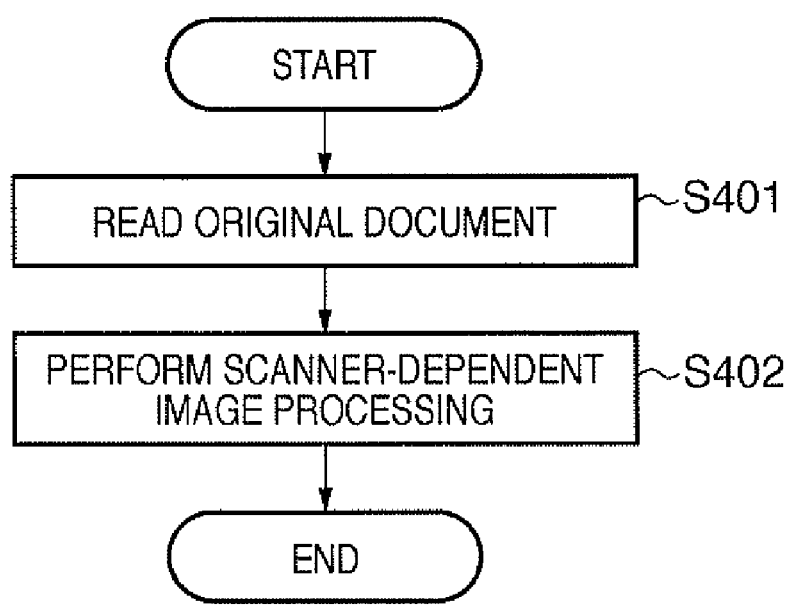
FIG. 4 is a flowchart illustrating an exemplary process for obtaining input image data according to an embodiment of the present invention.

A process for obtaining the input image data shall be described next. First, a case where the input image data is obtained using the image reading device 201 of the MFP 100 shall be described using FIG. 4. FIG. 4 is a flowchart illustrating an exemplary process for obtaining input image data. The processing illustrated in this flowchart is performed by a CPU in the data processing device 200 executing a computer program stored in a ROM. The obtained input image data is saved in, for example, the storage unit 303.

In step S401, the image reading device 201 reads an image from an original document.

In step S402, the data processing device 200 performs scanner-dependent image processing on the read input image data. "Scanner-dependent image processing" is, for example, color processing, filtering, and the like.

Figure 5:
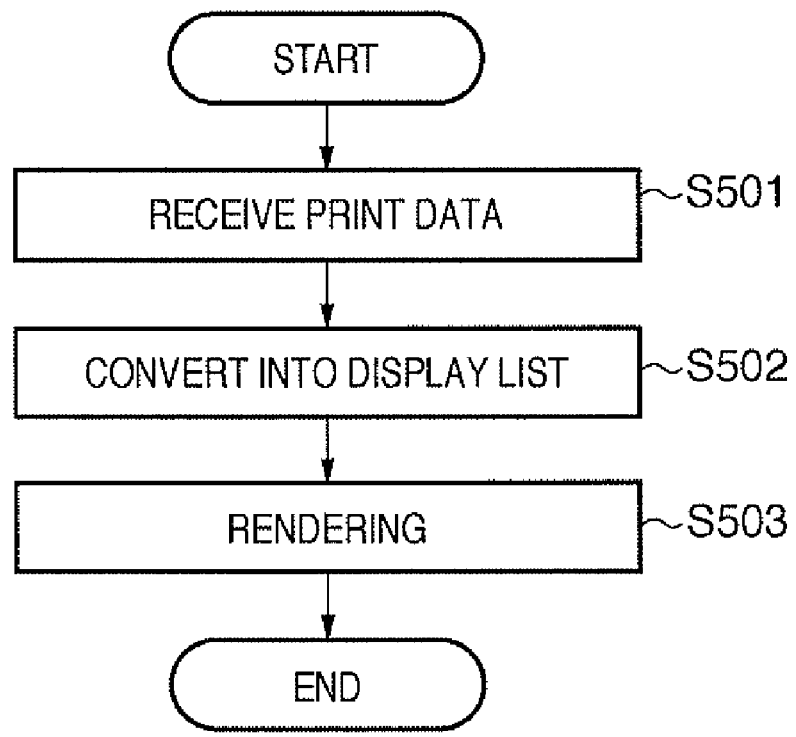
FIG. 5 is a flowchart illustrating another exemplary process for obtaining input image data according to an embodiment of the present invention.

Next, a case where image data generated by an application on the local PC 102 is obtained shall be described using FIG. 5. FIG. 5 is a flowchart illustrating another exemplary process for obtaining input image data. The processing illustrated in this flowchart is performed by a CPU in the data processing device 200 executing a computer program stored in a ROM.

In step S501, the MFP 100 receives print data created by an application on the local PC 102 and converted by a print driver. The "print data" mentioned here refers to PDL, and is, for example, LIPS, PostScript, or the like.

In step S502, the data processing device 200 converts the received print data into a display list using an interpreter.

In step S503, the data processing device 200 converts the display list into bitmap image data through rendering, and the resultant is taken as the input image data.

(Creation of Objects)

Figure 6:
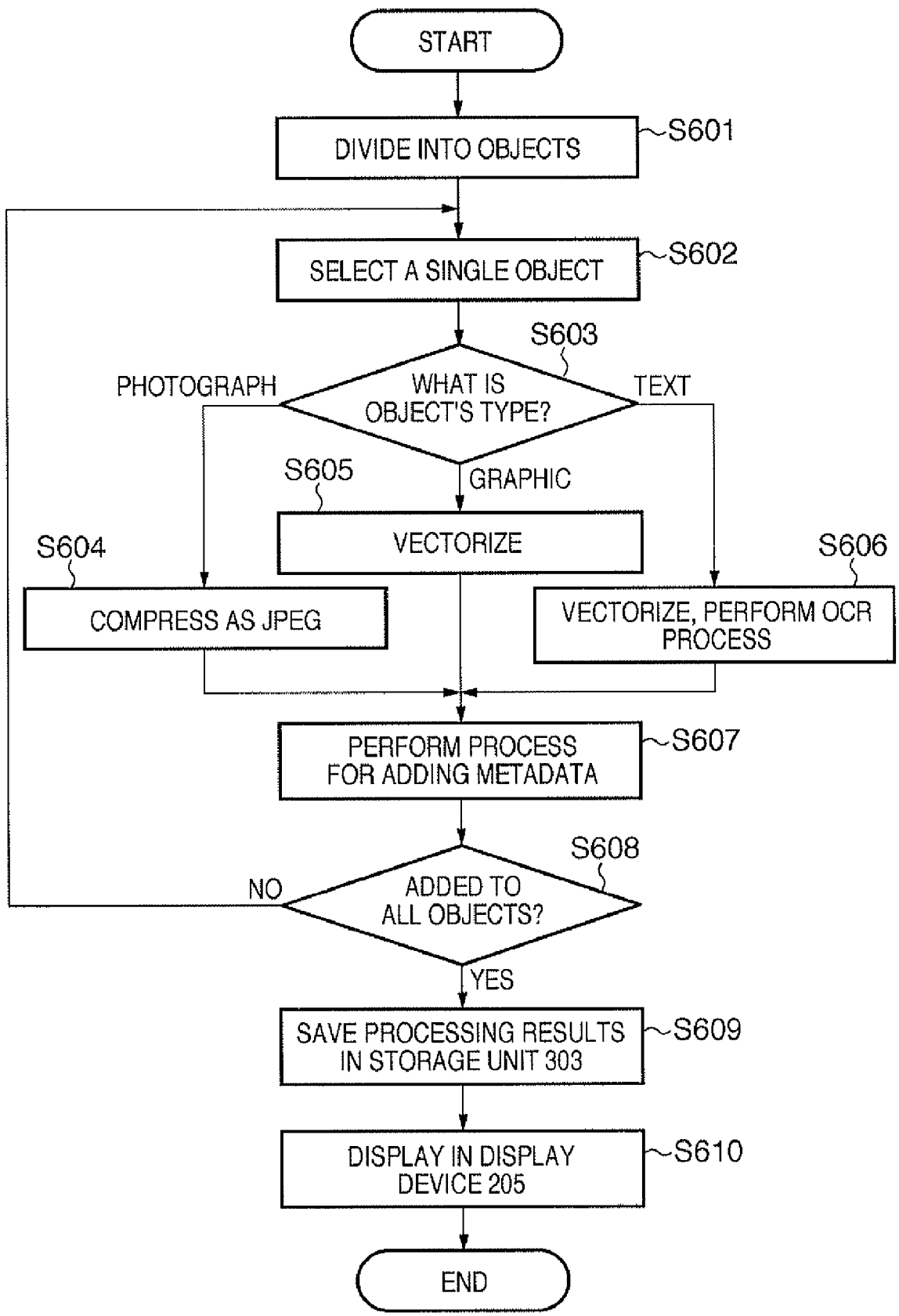
FIG. 6 is a flowchart illustrating how to create objects according to an embodiment of the present invention.

A process for creating objects from input image data and adding metadata thereto shall now be described using FIG. 6. FIG. 6 is a flowchart illustrating an exemplary objectification process. The processing illustrated in this flowchart is performed by a CPU in the data processing device 200 executing a computer program stored in a ROM.

In step S601, the association unit 301 divides the displayed region of the input image data into objects. Details of dividing the region into objects shall be given later.

In step S602, the addition unit 302 selects, as the object to be processed, a single object to which metadata has not yet been added.

In step S603, the determination unit 304 determines the type of the selected object. This determination is performed while the object is in bitmap format. The process moves to step S604 if the object is determined to be a photograph. However, the process moves to step S605 if the object is determined to be a graphic. Finally, the process moves to step S606 if the object is determined to be text.

In step S604, the addition unit 302 compresses the object determined to be a photograph (called a "photograph object" hereinafter) according to the JPEG format.

In step S605, the addition unit 302 vectorizes the object determined to be a graphic (called a "graphic object" hereinafter), thereby converting the object into passed data.

In step S606, the addition unit 302 vectorizes the object determined to be text (called a "text object" hereinafter) thereby converting the object into passed data. Additionally, the data processing device 200 executes an OCR process on the object, thereby obtaining character-encoded data.

In step S607, the addition unit 302 adds the optimal metadata based on the determination results for the selected object. Details regarding the addition of metadata shall be given later.

In step S608, the addition unit 302 determines whether or not metadata has been added to all objects. If an object to which metadata has not been added is still present ("NO" in step S608), the process returns to step S602, and a single object to which metadata has not yet been added is selected. However, if metadata has already been added to all objects ("YES" in step S608), the process moves to step S609.

In step S609, the addition unit 302 associates each of the objects to which metadata has been added with the input image data and saves the result in the storage unit 303.

In step S610, the display device 205 displays the saved image data. The user of the image processing system can then, for example, perform a data search using the metadata that has been added to the image data.

(Object Division Process)

Figure 7:
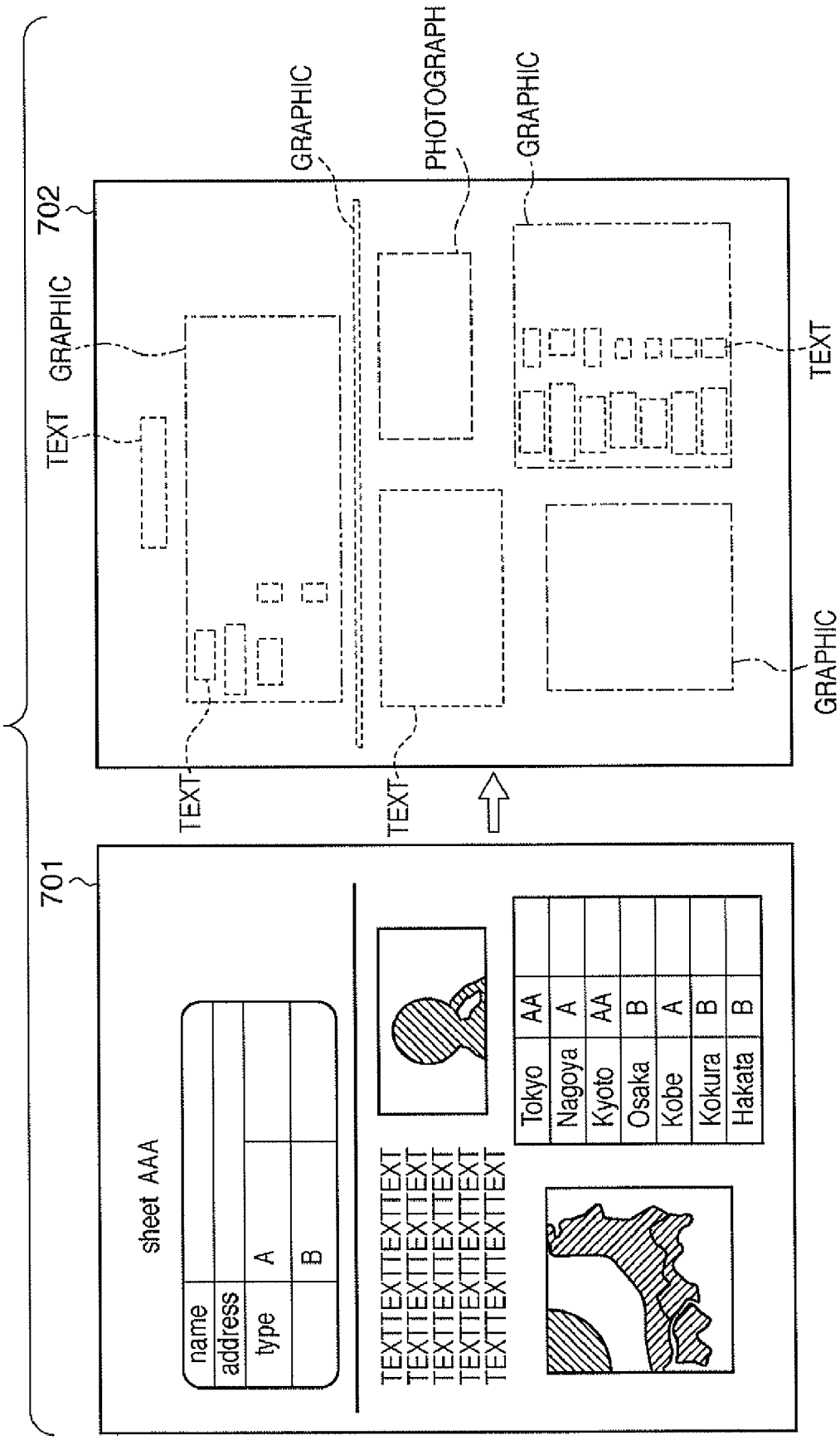
FIG. 7 is a diagram illustrating an exemplary process for converting input image data 701 into data 702 that has been divided into objects, according to an embodiment of the present invention.

Step S601 of FIG. 6 shall now be described in detail using FIG. 7. FIG. 7 is a diagram illustrating an exemplary process for converting input image data 701 into data 702 that has been divided into objects.

The input image data 701 is divided into rectangular blocks on an attribute-by-attribute basis. In the object division process, first, the input image data 701 is binarized into black-and-white data, and pixel clusters surrounded by black pixel outlines are extracted. Next, the number of pixels in the extracted black pixel clusters is evaluated, and outline tracing is executed on white pixel clusters contained within black pixel clusters that contain a number of pixels greater than or equal to a predetermined number. Then, as long as the internal pixel cluster is of a value greater than or equal to the predetermined value, the extraction of internal pixel clusters and execution of outline tracing is carried out recursively, with the number of pixels in white pixel clusters being evaluated and the black pixel clusters therein being traced. A rectangular block touching each outer edge of the pixel cluster obtained in this manner is then generated around the pixel clusters, and the attributes are determined based on the size and shape of the rectangular blocks.

As mentioned earlier, "text", "photograph", and "graphics" exist as attributes of a rectangular block. For example, a rectangular block with an aspect ratio near 1:1 and a number of pixels in a constant range may be a rectangular block for a text region, and is thus taken as a "text-corresponding block". When adjacent text-corresponding blocks are aligned with regularity, a new rectangular block consolidating those text-corresponding blocks is generated, and the new rectangular block is taken as a text region rectangular block. Meanwhile, flat pixel clusters, or black pixel clusters containing well-aligned white pixel clusters having no less than a set number of pixels and a quadrangular shape, are taken as graphic region rectangular blocks, and all other irregularly-shaped pixel clusters are taken as photograph region rectangular blocks. The association unit 301 identifies each of the regions obtained by division into rectangular blocks in this manner as objects.

(Metadata Addition Process)

Figure 8:
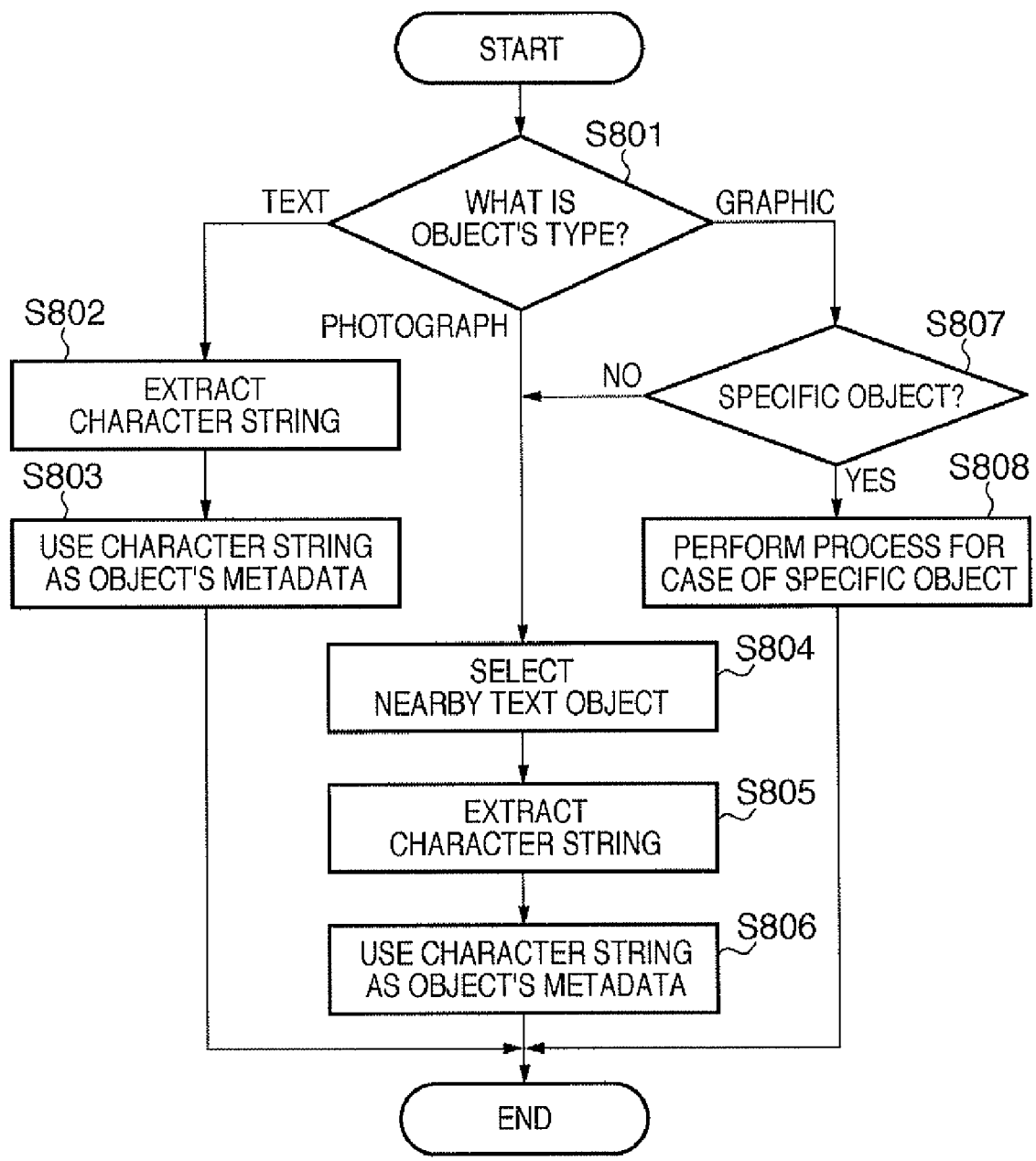
FIG. 8 is a flowchart illustrating exemplary details of a metadata addition process according to an embodiment of the present invention.

Step S607 of FIG. 6 shall now be described in detail using FIG. 8. FIG. 8 is a flowchart illustrating exemplary details of a metadata addition process. The processing illustrated in this flowchart is performed by a CPU in the data processing device 200 executing a computer program stored in a ROM.

In step S801, the determination unit 304 determines the type of the selected object.

If the object is determined to be a text object, the process moves to step S802, where the addition unit 302 extracts a character string from that text object. The character string extraction can be carried out through morphemic analysis, image feature amount extraction, syntax analysis, or the like.

In step S803, the addition unit 302 uses the extracted character string as the metadata of the text object, and the process ends.

If the object is determined to be a photograph object, the process moves to step S804, where the addition unit 302 selects the text object located nearest to that photograph object.

In step S805, the addition unit 302 extracts the character string expressed by the selected text object. As above, the character string extraction can be carried out through morphemic analysis, image feature amount extraction, syntax analysis, or the like. Note that if metadata has already been added to the text object, the addition unit 302 may use the character string expressed by that metadata.

In step S806, the addition unit 302 adds the extracted character string to the photograph object as metadata, and the process ends.

If the object is determined to be a graphic object, the process moves to step S807, where the determination unit 304 determines whether or not the graphic object is a specific object. "Specific object" refers to an object defined in advance when processing the input image data; a specific object has a leading region and a trailing region.

Figure 9:
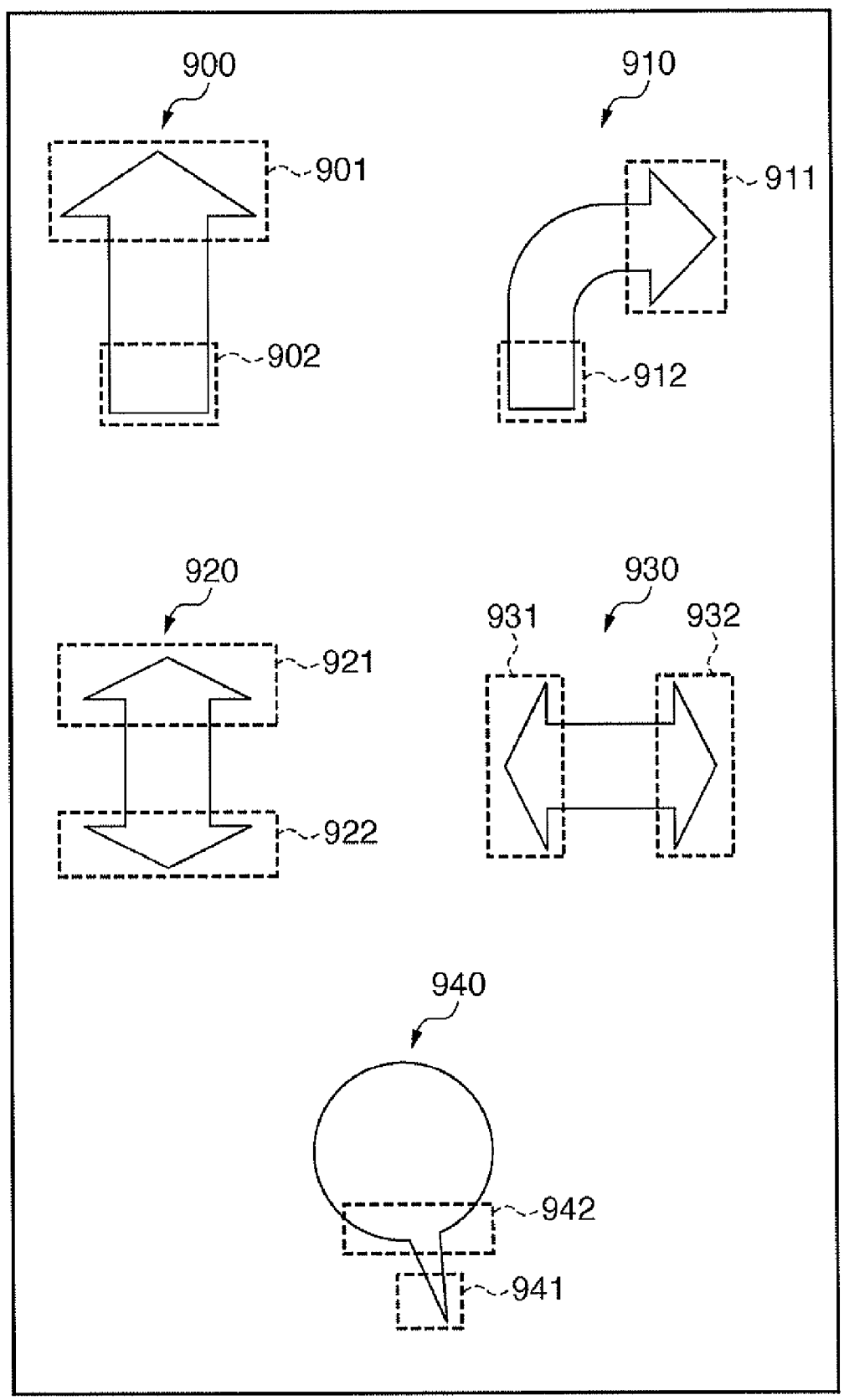
FIG. 9 is a diagram illustrating an exemplary specific object according to an embodiment of the present invention.

The specific object shall be described using FIG. 9. This "specific object" is an object that associates a certain region within the input image data with another certain region. The "specific object" may also be an object indicating that a certain object is important.

This "specific object" shall be described in detail hereinafter. FIG. 9 is a diagram illustrating an exemplary specific object. In a graphic object 900 in the shape of an arrow, a region 901 represents the leading region, whereas a region 902 represents the trailing region. In this manner, objects having defined leading and trailing regions are defined in advance as specific objects and saved in the storage unit 303. Although specific objects may be objects in which the leading and trailing regions can be intuitively identified, as with an arrow shape, the specific objects are not limited to such objects.

It is also unnecessary for the leading and trailing regions to be arranged linearly, and the shape may be as indicated by a graphic object 910. In this case, a region 911 expresses the leading region, whereas a region 912 expresses the trailing region.

Furthermore, the shape may be as indicated by a graphic object 920. Although both ends are arrows in this case, an upper region 921, for example, of the graphic object 920 is taken as the leading region, whereas a lower region 922 of the graphic object 920 is taken as the trailing region.

Similarly, the shape may be as indicated by a graphic object 930. Although both ends are arrows in this case as well, a left region 931, for example, of the graphic object 930 is taken as the leading region, whereas a right region 932 of the graphic object 930 is taken as the trailing region.

In addition, a graphic object 940 in the shape of a balloon has a characteristic whereby the inner and outer portions of the balloon are associated with each other. In this case, for the object 940, a region 941 on the outside of the opening in the balloon is taken as the leading region, whereas a region 942 on the inside of the opening in the balloon is taken as the trailing region.

A known method may be used in the determination of whether or not the selected object is a specific object. For example, when the specific object has an arrow shape, the arrow to be identified can be determined using a pattern matching method.

Returning to FIG. 8, if the object is determined to be a specific object ("YES" in step S807), the process moves to step S808. In step S808, the specific object is processed; details of this processing shall be given later. Meanwhile, if the object has been determined to not be a specific object ("NO" in step S807), the process moves to step S804, where the object is processed as a photograph object.

(Specific Object Processing)

Step S808 of FIG. 8 shall now be described in detail using FIG. 10. FIG. 10 is a flowchart illustrating exemplary details of specific object processing. The processing illustrated in this flowchart is performed by a CPU in the data processing device 200 executing a computer program stored in a ROM.

In step S1001, the determination unit 304 examines whether or not the specific object associates multiple differing objects, or whether the specific object indicates a certain object. To be more specific, it is determined whether the first object, or in other words an object indicated by the leading region, of the multiple differing objects, and the second object, or in other words an object indicated by the trailing region, of the multiple differing objects, are present. Hereinafter, the objects indicated by the leading/trailing regions shall be called a "leading-region-pointed object" and a "trailing-region-pointed object", respectively.

Figure 11A:
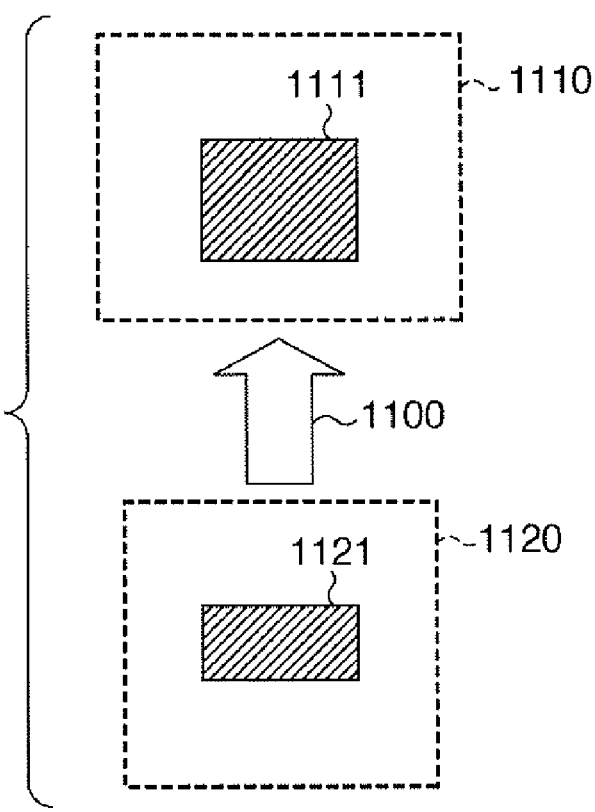
FIGS. 11A and 11B are diagrams illustrating an exemplary state where a specific object indicates another object, according to an embodiment of the present invention.

The leading- and trailing-region-pointed objects shall now be described using FIGS. 11A and 11B. FIG. 11A is a diagram illustrating an example of a state in which a specific object associates two differing objects. Similar to FIG. 9, a graphic object having an arrow shape is used as a specific object 1100. Here, the leading-region-pointed object of the specific object 1100 refers to an object located within a predetermined region 1110 near the leading region of the specific object 1100.

In the example in FIG. 11A, an object 1111 is the leading-region-pointed object of the specific object 1100. The predetermined region 1110 is defined by the user in advance based on the specific object 1100. The area of the region 1110 may be made variable to accommodate the type, the display size, and so on of the specific object 1100. Similarly, the trailing-region-pointed object of the specific object 1100 is an object 1121 located within a predetermined region 1120.

Figure 11B:
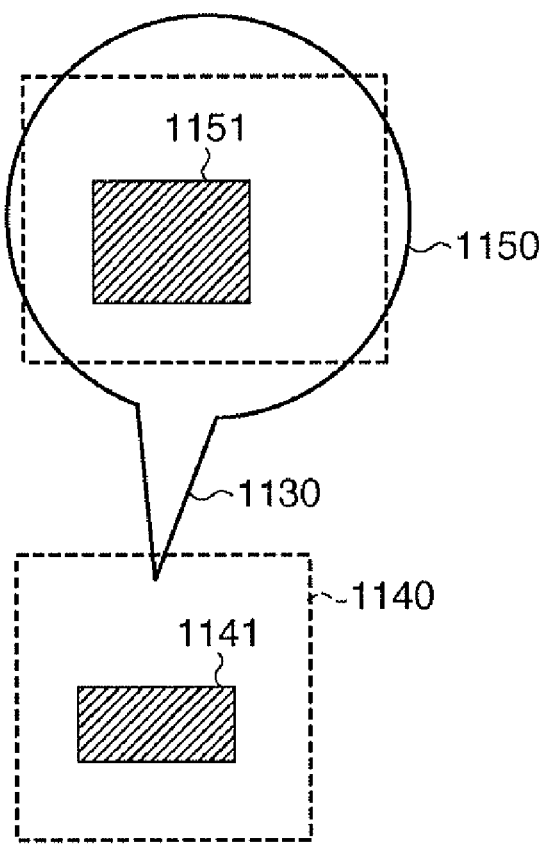

In the same manner, when the specific object has a balloon shape, as shown in FIG. 11B, the leading-region-pointed object of a specific object 1130 refers to an object located within a region 1140. In the example in FIG. 11B, an object 1141 is the leading-region-pointed object of the specific object 1130. Similarly, the trailing-region-pointed object of the specific object 1130 is an object 1151 located within a region 1150.

Note that when multiple objects are contained within the predetermined region, all objects contained within that region may be assumed to be indicated, or a single arbitrary object may be selected as the object that is indicated. The object closest to the specific object 1100 may be selected as the single arbitrary object. Furthermore, an object that partially overlaps with the predetermined region may be selected as the indicated object as well, rather than only objects located entirely within the predetermined region.

Returning to FIG. 10, if both a leading-region-pointed object and a trailing-region-pointed object are present in step S1001, the process moves to step S1002. If only the trailing-region-pointed object is present, the process moves to step S1003. Likewise, if only the leading-region-pointed object is present, the process moves to step S1004. If, however, neither of these objects is present, the normal graphic object processing, illustrated in steps S804 to S806 of FIG. 8, is performed in step S1005, after which the processing ends.

A metadata addition process for the case where both the leading-region-pointed object and the trailing-region-pointed object are present is carried out in step S1002. The state of the image data in such a case is, for example, as shown in FIG. 12A. FIGS. 12A to 12C are diagrams illustrating differences between pieces of image data caused by the presence/absence of a leading-region-pointed object/trailing-region-pointed object. Both a leading-region-pointed object 1202 and a trailing-region-pointed object 1201 are present for a specific object 1200, and the specific object associates those two objects. The leading-region-pointed object 1202 is a photograph object, and in this example, expresses a map. The trailing-region-pointed object 1201 is a text object, and has, in this example, a character string that reads "meeting place". With such image data, a viewer will likely think that the specific object 1200, which has an arrow shape, expresses the relevance between the leading-region-pointed object 1202 and the trailing-region-pointed object 1201, where the latter describes the former. Accordingly, "relevance" is added as metadata of the specific object 1200.

A photograph object serving as the leading-region-pointed object 1202, and a character string belonging to a text object serving as the trailing-region-pointed object 1201, may also be added to the metadata of the specific object 1200. Objects for which "relevance" has been added as metadata are objects that associate other objects.

Furthermore, a character string belonging to a text object serving as the trailing-region-pointed object 1201 is added to the metadata of the photograph object serving as the leading-region-pointed object 1202. The photograph object serving as the leading-region-pointed object 1202 is likewise added to the metadata of the trailing-region-pointed object 1201. The appropriate metadata is thus added based on the type of the leading-region-pointed object 1202 and the type of the trailing-region-pointed object 1201, as described thus far.

Accordingly, if a user enters a keyword contained in the metadata of the leading-region-pointed object when performing a search, the leading-region-pointed object is displayed as the search result; the content of the trailing-region-pointed object is also contained within the metadata of that leading-region-pointed object. Similarly, if a user enters a keyword contained in the metadata of the trailing-region-pointed object when performing a search, the trailing-region-pointed object, to which metadata containing the content of the leading-region-pointed object has been added, is displayed as the search result.

Furthermore, if a user enters "relevance" as a keyword when performing a search, the specific object is displayed as the search result. If the content of a leading-region-pointed object or trailing-region-pointed object has been added to the metadata of that specific object, associated leading- or trailing-region-pointed objects can be searched for by checking the metadata belonging to that specific object.

The user defines, in advance, what kind of metadata is to be added to each combination of objects using a table 1300 as shown in FIG. 13. The table 1300 is stored in the storage unit 303.

FIG. 13 is an exemplary table 1300 referred to when adding metadata. The metadata to be added is defined for each combination of leading-region-pointed object 1301 and trailing-region-pointed object 1302. In this table, leading region metadata 1303 and trailing region metadata 1304 represent metadata added to leading-region-pointed objects and trailing-region-pointed objects, respectively. Specific metadata 1305, meanwhile, represents metadata added to a specific object.

If the trailing-region-pointed object 1302 is a specific object as well, as in row 1306, the metadata of the leading-region-pointed object 1301 is also added based on the object indicated by that specific object. The processing ends after the metadata has been added. It goes without saying that the addition of metadata is not limited to the example illustrated in the table 1300.

A metadata addition process for the case where only a trailing-region-pointed object is present is carried out in step S1003. FIG. 12B, for example, illustrates such a state. Such a state may occur, for example, when the image data is made up of multiple pages. In such a case, it can be thought that the leading region of a specific object 1210 indicates the entirety of image data present in a page previous to the page that contains the specific object 1210. Accordingly, the metadata of a trailing-region-pointed object 1211 is set to "image data located in previous page", and the metadata of the specific object 1210 is set to "relevance". Details regarding such a case where the image data is made up of multiple pages shall be given in the second embodiment.

However, in a case such as this, it may be assumed that the specific object does not indicate relevance, and thus the normal graphic object processing, illustrated in steps S804 to S806 of FIG. 8, may be performed. The processing ends after the metadata has been added.

A metadata addition process for the case where only a leading-region-pointed object is present, or in other words, the case where the specific object indicates another object, is carried out in step S1004.

FIG. 12C, for example, illustrates such a state. With such image data, a viewer will likely think that a specific object 1220, which has an arrow shape, expresses a level of importance indicating that a leading-region-pointed object 1222 is important data. Accordingly, the addition unit 302 adds "importance" as the metadata of the specific object 1220. Objects in which "importance" has been added to the metadata are objects that express the importance of other objects.

For example, a user can easily check the image data for highly-important objects by searching for objects for which "importance" has been added to the metadata. In addition to adding "importance" as the metadata, the content of the leading-region-pointed object may be added as well. The metadata of the leading-region-pointed object may be added based on the content of that object.

However, in a case such as this, it may be assumed that the specific object does not indicate relevance, and thus the normal graphic object processing, illustrated in steps S804 to S806 of FIG. 8, may be performed. The processing ends after the metadata has been added.

According to the present embodiment described thus far, metadata is added based on the content indicated by the graphic object, and thus the appropriate metadata can be added to objects within image data.

Second Embodiment

Figure 14:
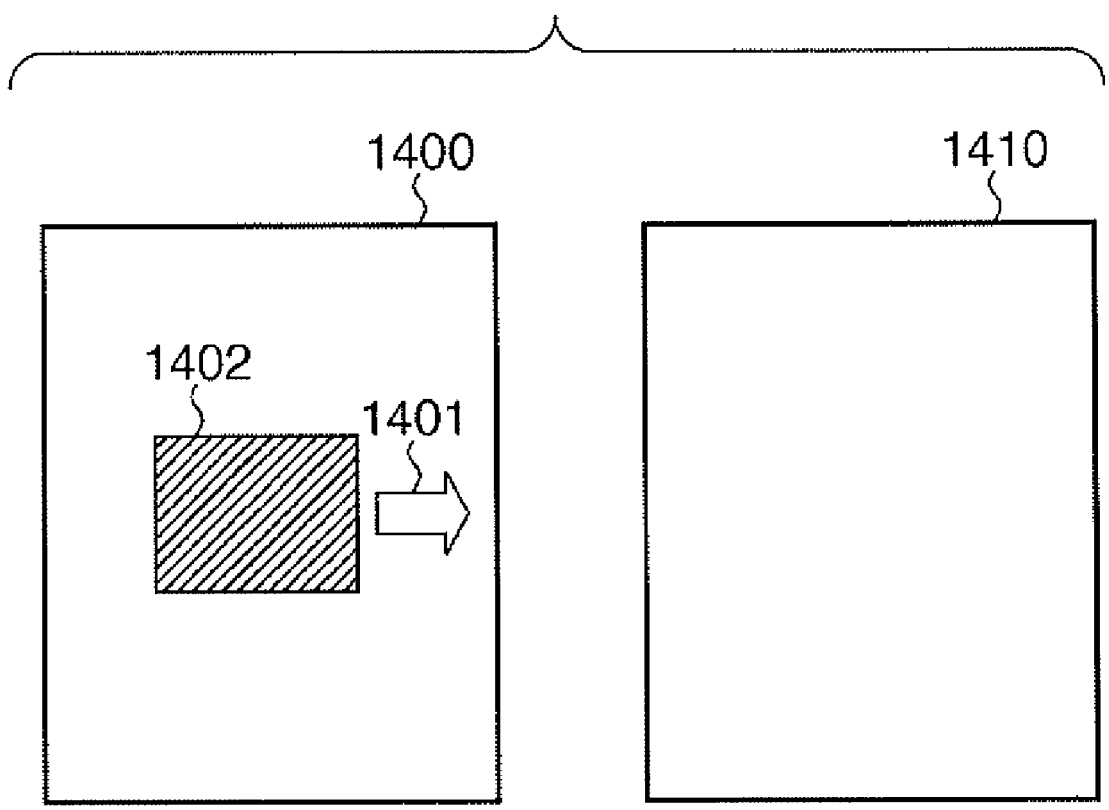
FIG. 14 is a diagram illustrating a case where a specific object is present at the end of a page, according to a second embodiment of the present invention.

The present embodiment discusses a variation that can be used when the input image data is made up of multiple pages. Descriptions of structures and processes identical to those in the first embodiment shall be omitted. An outline of the present embodiment shall be given using FIG. 14. FIG. 14 is a diagram illustrating an example of a case where a specific object is present at the end of a page.

It is assumed that the image data is made up of two pages, or pages 1400 and 1410. No object is present in the region indicated by the leading region of a specific object 1401. However, because the specific object 1401 is located at the end of the page, an object 1402 can be thought of as indicating the next page 1410. Therefore, when the specific object 1401 is located at the end of the page and the leading region or trailing region thereof indicates a region outside of that page, a process for associating that page with the adjacent page is performed.

The determination as to whether or not an object indicates another page can be carried out by determining whether or not a predetermined region indicated by the leading region or trailing region fits within the page on which that object is located. If the region fits within the page, it is determined that the object does not indicate another page.

However, if the object indicated by the leading region of the specific object does not fit within the same page as the specific object, it is determined that the specific object indicates another page. If the leading region indicates the next page, that next page is set in the metadata of the trailing-region-pointed object. Meanwhile, if the trailing region indicates the previous page, that previous page is set in the metadata of the leading-region-pointed object. To be more specific, a thumbnail image of the previous or following page is set in the metadata, a character string expressing the content of the previous or following page is set in the metadata, or the like. As in the first embodiment, the metadata of the specific object is set to "relevance".

In this manner, the appropriate metadata can be added to objects within image data even when the image data is made up of multiple pages.

Third Embodiment

In the first embodiment, the metadata of a specific object is set to "importance" in the case where only the leading-region-pointed object is present, or in other words, the case where the specific object indicates a certain object; this makes it possible to search for documents of high importance. In the present embodiment, however, the importance is defined for individual objects, thereby increasing the convenience for the user.

In the present embodiment, the storage unit 303 stores the importance of each object. The association unit 301 sets the importance for each object obtained through the division performed in step S601 of FIG. 6. The same importance may be set for all objects, or different importances may be set for each type of object.

In step S1004 of FIG. 10, the addition unit 302 performs the following additional processing. First, the addition unit 302 calculates the display size of the specific object. This display size may be calculated based on, for example, the number of pixels in the specific object. The addition unit 302 then adds metadata indicating the importance to the leading-region-pointed object based on the display size of the specific object. Metadata indicating a higher importance for larger specific objects may be added to the leading-region-pointed object.

Furthermore, the degree with which the importance of the leading-region-pointed object increases may be changed based on the display color of the specific object. For example, the addition unit 302 calculates the average RGB value of the specific object and determines the degree of increase based on that average value.

In this manner, setting the importance for objects and changing that importance depending on the specific object makes it possible for a user to easily identify objects of high importance.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

An embodiment of the present invention can provide an information processing apparatus (100) comprising: association means (301) configured to divide input image data into regions and identify each region as an object; addition means (302) configured to add metadata to each object based on the type of each object; and determination means (304) configured to determine whether or not a specific object that associates a region within the input image data with a region aside from the region within the input image data is present among the objects, wherein in the case where the determination means (304) has determined that the specific object is present, the addition means (302) further adds, to the object that is the region within the input image data, the metadata of the object that is the region aside from the region within the input image data and that has been associated with the object that is a region within the input image data by the specific object.

Preferable, in the case where the specific object associates a first object that is the region within the input image data with a second object that is the region aside from the region within the image data, the addition means (302) adds the metadata of the first object based on the content of the second object and adds the metadata of the second object based on the content of the first object.

Preferably, in the case where the specific object associates a first object that is the region within the input image data with a second object that is the region aside from the region within the image data, the addition means (302) adds, to the specific object, metadata indicating that the specific object is an object having content expressing that the first object and the second object are associated.

Preferably, in the case where the input image data is made up of multiple pages, and a first object present in a region indicated by the leading region of the specific object is not present on the same page as the specific object and a second object associated with the first object by the specific object, the addition means (302) adds, to the second object associated with the first object by the specific object, metadata based on the content of the page indicated by the specific object.

Preferably, in the case where the input image data is made up of multiple pages, and a first object present in a region indicated by the leading region of the specific object is not present on the same page as the specific object and a second object associated with the first object by the specific object, the addition means (302) adds, to the specific object, metadata indicating that the specific object is an object having content expressing that the page on which the first object is present and the second object are associated.

Another embodiment of the invention can provide an information processing apparatus (100) comprising: association means (301) configured to divide input image data into regions and identify each region as an object; addition means (302) configured to add metadata to each object based on the type of each object; and determination means (304) configured to determine whether or not a specific object that indicates at least one of the objects is present, wherein in the case where the determination means (304) has determined that the specific object is present, the addition means (302) further adds, to the object indicated by the specific object, metadata indicating importance.

Preferably, the addition means (302) adds, to the object indicated by the specific object, metadata indicating importance based on at least one of the display color of the specific object and the display size of the specific object. Preferably, in the case where an object indicated by the specific object is present, the addition means (302) adds, to the specific object, metadata indicating that the object indicated by the specific object is important.

Preferably, the shape of the specific object is an arrow.
Preferably, the shape of the specific object is a balloon.

Another embodiment of the claimed invention can provide a control method for an information processing apparatus, the method comprising the steps of: dividing (S601) input image data into regions and identifying each region as an object; adding (S607) metadata to each object based on the type of each object; and determining (S807) whether or not a specific object that associates a region within the input image data with a region aside from the region within the input image data is present among the objects, wherein in the case where the determining has determined that the specific object is present, the adding (S607) further adds (S808), to the object that is the region within the input image data, the metadata of the object that is the region aside from the region within the input image data and that has been associated with the object that is a region within the input image data by the specific object.

Another embodiment of the claimed invention can provide a control method for an information processing apparatus, the method comprising the steps of: dividing (S601) input image data into regions and identifying each individual region as an object; adding (S607) metadata to each object based on the type of each object; and determining (S807) whether or not a specific object that indicates at least one of the objects is present, wherein in the case where the determining (S807) has determined that the specific object is present, the adding (S607) further adds (S1004), to the object indicated by the specific object, metadata indicating importance.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-243337, filed Sep. 22, 2008 which is hereby incorporated by reference herein in its entirety.

What is claimed is:

1. An information processing apparatus comprising:
an association unit configured to divide input image data into regions and to associate each region with one or more types of objects;
an appending unit configured to append metadata to each object based on the type of each object;
a determination unit configured to determine whether or not the input image data includes a specific object that associates a first object with a second object, wherein the first object has first metadata and is located at a first region of the input image data, and the second object has second metadata and is located at a second region different from the first object of the input image data, and
an addition unit configured to, in the case where the determination unit has determined that the input image data includes the specific object, add the second metadata of the second object to the first metadata of the first object if the type of the second object is a text object, and add the second object to the first metadata of the first object if the type of the second object is not a text object,
wherein at least one of the association unit, the appending unit, the determination unit and the addition unit comprises at least one of a processor and a non-transitory computer-readable storage medium,
wherein in the case where the input image data comprises multiple pages and the second object is indicated by a leading region of the specific object, if the second object is not present on the same page as the specific object and the first object, the appending unit appends, to the first object, metadata based on the content of the page indicated by the specific object, and
wherein the appending unit appends, to the specific object, metadata indicating that the specific object associates the page on which the first object is present with the page on which the second object is present.

2. The information processing apparatus according to claim 1, wherein the appending unit is configured to append, to the specific object, metadata indicating that the specific object associates the first object with the second object.

3. The information processing apparatus according to claim 1, wherein the shape of the specific object is an arrow.

4. The information processing apparatus according to claim 1, wherein the shape of the specific object is a balloon.

5. The information processing apparatus according to claim 1, wherein in the case where the determination unit has determined that the input image data includes the specific object, the addition unit adds data to the first metadata of the first object based on a content of the second object, and adds data to the second metadata of the second object based on a content of the first object.

6. A control method for an information processing apparatus, the method comprising:
dividing input image data into regions and associating each region with one or more types of objects;
appending metadata to each object based on the type of each object;
determining whether or not the input image data includes a specific object that associates a first object with a second object, wherein the first object has first metadata and is located at a first region of the input image data, and the second object has second metadata and is located at a second region different from the first object of the input image data, and
in the case where it is determined that the input image data includes the specific object, adding the second metadata of the second object to the first metadata of the first object if the type of the second object is a text object, and adding the second object to the first metadata of the first object if the type of the second object is not a text object,
wherein in the case where the input image data comprises multiple pages and the second object is indicated by a leading region of the specific object, if the second object is not present on the same page as the specific object and the first object, the appending step appends, to the first object, metadata based on the content of the page indicated by the specific object, and
wherein the appending step appends, to the specific object, metadata indicating that the specific object associates the page on which the first object is present with the page on which the second object is present.

7. A non-transitory computer-readable storage medium retrievably storing a computer-executable program which, when executed by a computer, causes the computer to perform the control method according to claim 6.

8. An information processing apparatus comprising:
an association unit configured to divide input image data into regions and to associate each region with one or more types of objects;
an appending unit configured to append metadata to each object based on the type of each object;
a determination unit configured to determine whether or not the input image data includes a specific object that associates a first object with a second object, wherein the first object has first metadata and is located at a first region of the input image data, and the second object has second metadata and is located at a second region different from the first object of the input image data, and
an addition unit configured to, in the case where the determination unit has determined that the input image data includes the specific object, add one of the second object and the second metadata to the first metadata of the first object, based on a type an object,
wherein at least one of the association unit, the appending unit, the determination unit and the addition unit comprises at least one of a processor and a non-transitory computer-readable storage medium, wherein in the case where the input image data comprises multiple pages and the second object is indicated by a leading region of the specific object, if the second object is not present on the same page as the specific object and the first object, the appending unit appends, to the first object, metadata based on the content of the page indicated by the specific object, and wherein the appending unit appends, to the specific object, metadata indicating that the specific object associates the page on which the first object is present with the page on which the second object is present.

9. The information processing apparatus according to claim 8, wherein the second metadata of the second object is added to the first metadata of the first object if the type of the second object is a text object, and the second object is added to the first metadata of the first object if the type of the second object is not a text object.

10. The information processing apparatus according to claim 8, wherein the second metadata of the second object is added to the first metadata of the first object if the type of the first object is a text object, and the second object is added to the first metadata of the first object if the type of the first object is not a text object.

* * * * *